March 5, 1940. W. H. WATSON Re. 21,384

STEAM GENERATOR

Original Filed April 4, 1934 2 Sheets-Sheet 1

INVENTOR.

William H. Watson

March 5, 1940. W. H. WATSON Re. 21,384

STEAM GENERATOR

Original Filed April 4, 1934 2 Sheets-Sheet 2

INVENTOR.

William H. Watson

Reissued Mar. 5, 1940

Re. 21,384

UNITED STATES PATENT OFFICE 21,384

STEAM GENERATOR

William H. Watson, deceased, late of Wichita, Kans., by Mary L. Watson, administratrix, Wichita, Kans., assignor to The Watson Water Tube Boiler Company, Inc., Wichita, Kans., a corporation of Kansas Original No. 2,110,432, dated March 8, 1938, Serial No. 718,887, April 4, 1934. Application for reissue February 6, 1939, Serial No. 254,978

4 Claims. (Cl. 122—148)

This invention relates to a novel steam generator, or boiler and is particularly applicable to industrial installations for generating steam under pressure or for heating liquids.

The primary object of this invention is to provide a steam boiler that is complete within itself, portable, does not require a brick setting or furnace and could be effectively insulated, and a small boiler that would operate at an overall efficiency equal to the larger installations.

A further object of this invention is to provide a boiler constructed in such a manner that the combustion chamber and the water tube heating surfaces are enclosed within a cylindrical shell and entirely surrounded by the liquid to be heated, thereby increasing the efficiency of the heating surfaces and reducing the strain on the metal to a minimum.

A further object of this invention is to construct a steam boiler of the internally fired type with a positive circulation of the liquid over the heating surface, reducing strain on the metal and adding to the efficiency of the boiler.

Another object of this invention is to construct an internally fired water tube boiler which is accessible for cleaning or replacement of parts, and due to its compactness and simplicity would be economical to manufacture and install, either as a portable or stationary boiler.

Other objects and advantages of this invention will be apparent during the course of the following detailed specification:

In the drawings, forming a part of this specification similar reference characters designate corresponding parts throughout the several views.

Figure 1:
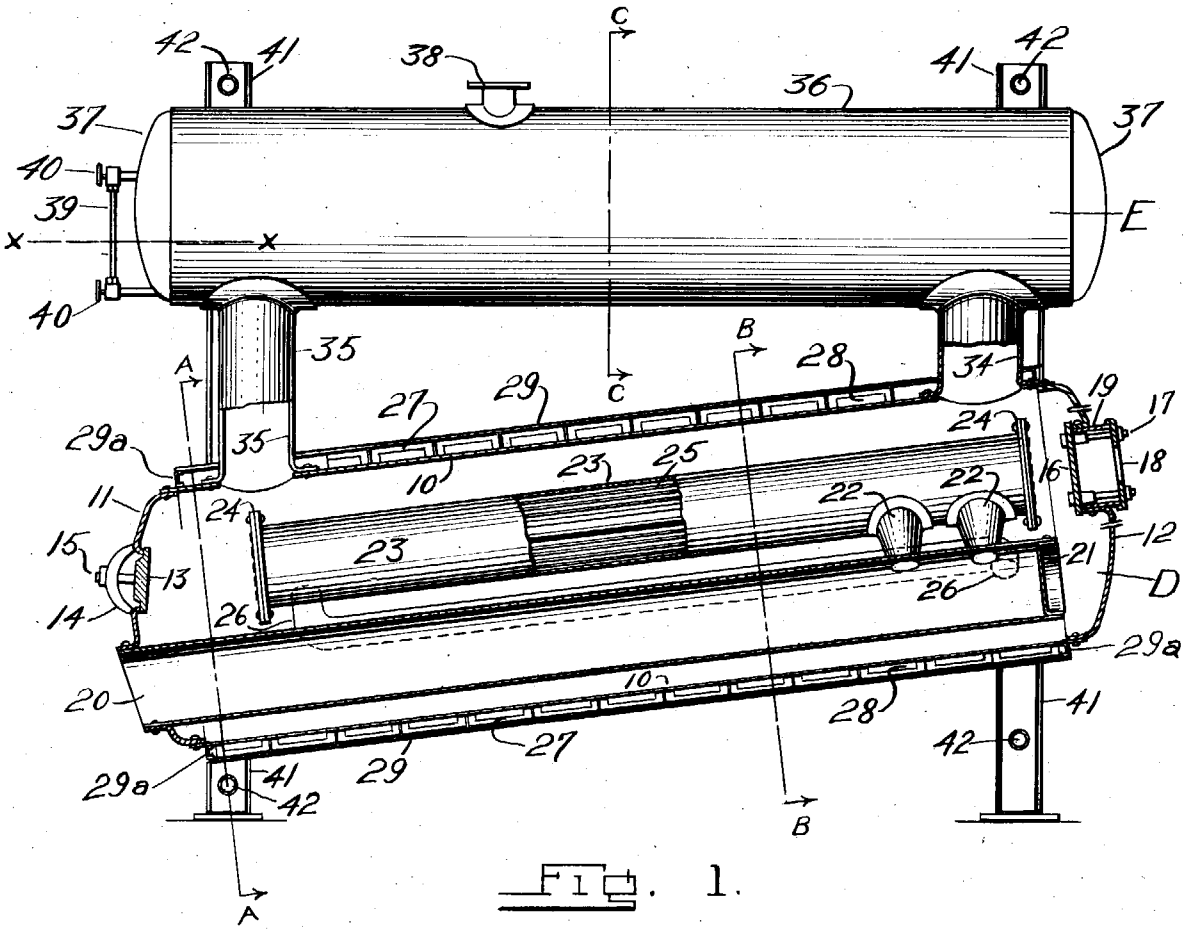
Figure 1 is a longitudinal section of the steam generating unit, with a side elevation of the superimposed steam separating drum. A fragmentary view of the water tube chamber, and a section of the inspection opening at the end of the water tube chamber is also shown.
Figure 2:
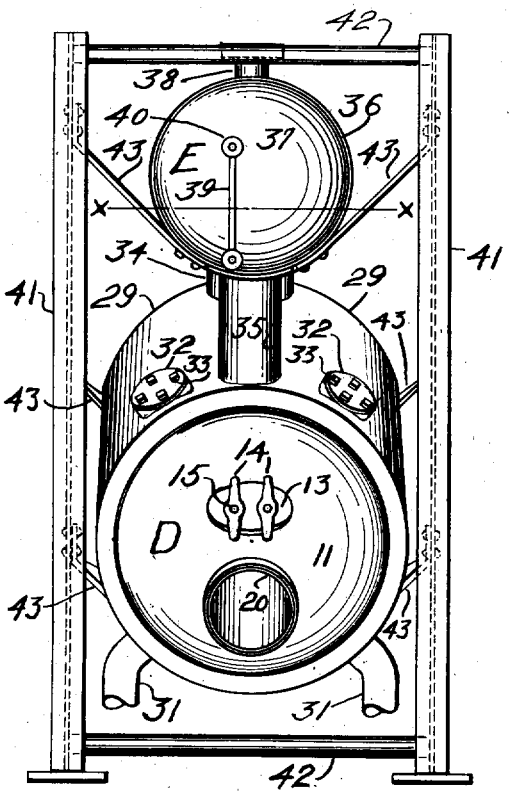
Figure 2 is a front view of the boiler including the steam generating unit and the steam separating drum.
Figure 3:
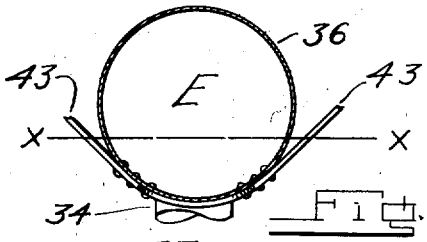
Figure 3 is a cross section of the steam separating drum taken substantially on the line C—C Fig. 1.
Figure 4:
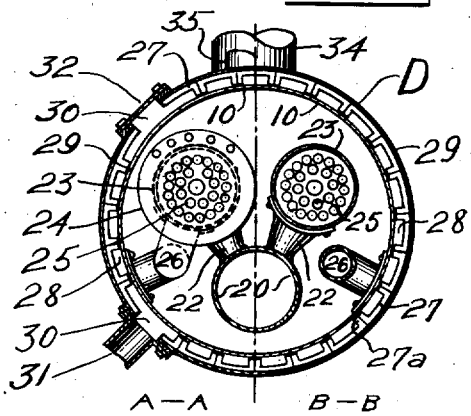
Figure 4 is a half cross section of the steam generating unit taken substantially on the line A—A and a half cross section taken substantially on the line B—B Fig. 1.
Figure 5:
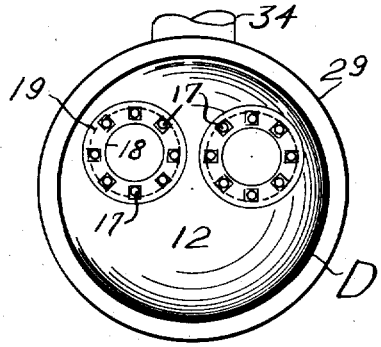
Figure 5 is a rear view of the steam generating unit.
Figure 6:
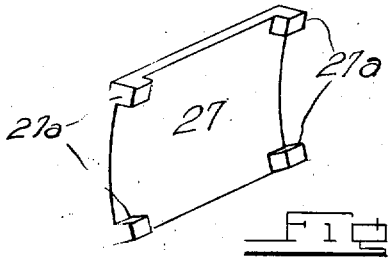
Figure 6 is a pictorial view of the refractory insulating tile surrounding the steam generating unit.

In the drawings, wherein for the purpose of illustration is shown only the preferred embodiment of this invention, the letter D indicates the improved steam generating unit and the letter E indicates the steam separating unit.

Referring to the steam generating unit D. In the drawings, number 10 is the steam generator shell with the front head 11 and the back head 12 securely attached. 13 is a manhole cover held in place by the crab 14 and the crab bolt 15. Number 16 is an inspection plate located at the end of the water tube heating chamber and held in place by the bolts 17 passing through the ring 18 thus closing the opening formed by the nipple 19 which is securely fastened into the back head 12. Number 20 is a tubular combustion chamber one end of which is securely fastened into an opening provided in the front head 11 and extending back into the unit D to a point near the back head 12 and terminating with a blank end closed by the head 21 securely fastened thereto. The combustion chamber 20 is connected with the two or more water tube heating chambers 23 by the connecting nozzles 22. Said nozzles 22 serve to support said chambers at their rear ends from said combustion chamber to provide a unitary heating element assembly.

Number 23 is a tubular shell with heads 24 securely fastened thereto, the heads 24 being drilled to receive a number of water tubes 25 which pass through the interior of the tube 23 parallel with its longitudinal axis, forming a water tube heating compartment. Number 26 is a pipe connecting the interior of each of the water tube compartments to the outside of the shell 10, it being suitably connected to a tube 23 and the shell 10. The shell 10 is enclosed by an insulating jacket of refractory tile 27, the tile being formed to the contour of the shell 10 and held a suitable distance from the shell by the boss 27a located at the corner of each tile, thus forming a passage 28 between the shell 10 and the jacket 27 for the passage of gas around or over the shell. The tile jacket is protected, and the gas passage sealed by a sheet metal covering 29.

The sheet metal covering 29 is secured to the unit D by being fastened to the channel 29a (Fig. 1) which in turn, is welded to the shell 10. Openings 30 are provided for the passage of the gas from the space 28 to the exhaust pipe 31. These openings are preferably located 90 degrees apart around the unit D at the end opposite to the point where the gas enters the passage 28 from the pipe 26. The openings 30 not in use are closed by a blank flange 32 held in place by the bolts 33.

The steam generating unit D is connected to the steam separating unit E by the uptake pipe 34 and the down pipe 35. The separating unit E consists of a horizontally disposed cylindrical shell 36 with heads 37 securely attached in each end thereof. This unit is provided with a steam outlet 38 and a water glass 39 and water glass connection valves 40. The approximate water line is indicated by the line X—X. The boiler assembly is supported by the columns 41 and the braces 42. The steam generating unit D and the steam separating unit E are fastened to the supporting frame by the straps 43, with the axis of said unit D inclined upwardly toward its rear end. Other necessary braces, hangers, or supports would be of the conventional type and are not included in the drawings.

Referring to the steam generating units, the operation would be as follows:

The fuel would be fired at the open end of the tubular combustion chamber 20, the products of combustion passing through the nozzles 22 into the two or more water tube heating chambers 23 where they would envelope the water tubes and flow to the opposite end of the tubular water tube chamber. From the water tube heating chamber, the gas would flow into the pipe 26 and to the space 28 surrounding the shell 10 where they would travel to the exhaust openings 30 and to the atmosphere, or to an economizer through the exhaust pipe 31.

Referring to the boiler including the steam generating unit D and the steam separating unit E, the water circulation would be as follows: The water level being at the line X—X in the steam separating unit, the entire generating unit including the down pipe 35 and the uptake pipe 34, would be filled with water, and the heating element enclosed within the steam generating unit D, would be completely submerged in water, or the liquid to be heated. When heat is applied to the heating surfaces in the generating unit, the liquid would become lighter and move toward the elevated end of the generating unit, hence up through the uptake pipe into the separating unit E. In the compartment E, the steam would separate from the liquid and remain in the upper part of the drum, while the liquid would flow through the drum and return to the generating unit through the down pipe, to be reheated, thus completing a continuous cycle.

The rapidity of circulation of the water is greatly increased and the efficiency of heat transfer enhanced by reason of the particular arrangement and construction of the combustion chamber and associated water tube casings. It will be noted, for instance, that the heated gaseous products of combusion, while probably at their highest temperature, enter the higher ends of the water tube casings 23 and thence pass through said casings to the lower ends thereof in counterflow relationship to the water in the tubes 25. A high rate of heat transfer is thus maintained. At the same time, the natural upward flow of water, due to convection, through the tubes 25 from the lower to the higher end of the boiler shell is greatly increased by reason of the fact that the gases of combustion are hottest where they enter the water tube casings at the higher ends thereof. Since said water tube casings terminate at their uppper ends short of the rear head of the boiler shell and almost directly below the uptake pipe 34, the heated water and steam are free to rise through said uptake pipe immediately upon emergence from said ends of the casings. The lower ends of said casings 23 similarly terminate in spaced relationship to the front head of the boiler shell and directly below the down tube 35 to facilitate the flow of the cooler water into the lower ends of the water tubes 25.

Various changes in the size, shape and arrangement of the various parts may be made to the form of this invention herein shown and described, without departing from the spirit of the invention or the scope of the claims.

The water may be admitted through the pipe 35*a* connected to any suitable source. The combustion chamber is preferably lined with carborundum or some refractory material which will be heated to incandescence to improve combustion.

It is known that the circulation principle is used in water tube boilers, also that there are a number of different kinds of internally fired boilers. Therefore these features are not claimed broadly.

What is claimed is:

1. An internally fired boiler comprising a steam generating unit consisting of a water casing heating element including three tubular sections in the steam generating unit spaced substantially 120 degrees apart around a common center parallel with the longitudinal axes of said tubular sections, one of said tubular sections secured at one end to the water casing and provided with an opening at its fixed end, the other end of said section terminating in a closed end and forming a combustion chamber, the other two tubular sections each containing a plurality of water tubes passing through the sections longitudinally and fastened into openings provided in the heads at each end of each of said sections, tubes connecting the three sections each at one end and tubes connecting the opposite ends of said other two sections to the outside of the casing, means for passing the hot gases from the combustion tube into the water chamber sections and to the outside of the water casing.

2. A steam boiler, comprising a water casing, a heating element, including a plurality of tubular sections in the generating unit substantially 120 degrees apart around a common center parallel with the longitudinal axes of said tubular sections, one of said tubular sections being closed at one end and fixed at the other end to the water casing, the fixed end prrovided with an opening, the other tubular sections each having heads at the ends and each section containing a plurality of water tubes passing through the sections longitudinally and fastened into openings provided at the heads of each end of each of said sections, tubes connecting the said other sections each at one end to the combustion chamber and tubes connecting the opposite ends of said sections to the outside of the casing, providing means for passing hot gases from the combustion chamber into the water tube sections and to the outside of the water casing.

3. A steam boiler, comprising a water casing, a heating element, including a plurality of tubular sections in the generating unit spaced around a common center parallel with the longitudinal axes of said tubular sections, one of said tubular sections being closed at one end and fixed at the other end to the water casing, the fixed end provided with an opening, the other tubular sections each having heads at their ends and each said other section containing a plurality of water tubes passing through the sections longitudinally and fastened into openings provided at the heads of each end of each of said sections, tubes connecting the said other sections each at one end to the combustion chamber and tubes connecting the opposite ends of said sections to the outside of the casing, providing means for passing hot gases from the combustion chamber into the water tube sections and to the outside of the water casing.

4. An internally fired water tube boiler, comprising a boiler shell having front and rear headed ends, a concentric outer plate defining a gaseous space about said shell, a combustion chamber extending through said front headed end and fixedly secured therein with its rear end terminating short of the rear headed end of said shell, a plurality of rearwardly and upwardly inclined water casings disposed within said shell and having headed ends spaced from the headed ends of said shell, water tubes extending the full lengths of said casings through the headed ends thereof, conduits connecting the rear end of said combustion chamber directly to the interiors of the rear ends of said water casings for flow of the gaseous products of combustion directly from said combustion chamber into said casings and thence to the front ends thereof and other conduits connecting the interiors of the front ends of said casings to said gaseous space about said boiler shell.

MARY L. WATSON,
*Administratrix of the Estate of William H. Watson, Deceased.*